(12) United States Patent
Unis

(10) Patent No.: US 11,026,482 B1
(45) Date of Patent: Jun. 8, 2021

(54) PRODUCT AND PROCESS FOR CUSTOM-FIT SHOE

(71) Applicant: Unis Brands, LLC, Aliquippa, PA (US)

(72) Inventor: Nicholas Joseph Unis, Aliquippa, PA (US)

(73) Assignee: Unis Brands, LLC

( * ) Notice: Subject to any disclaimer, the term of this patent is extended or adjusted under 35 U.S.C. 154(b) by 422 days.

(21) Appl. No.: 16/243,116

(22) Filed: Jan. 9, 2019

Related U.S. Application Data

(60) Provisional application No. 62/615,056, filed on Jan. 9, 2018.

(51) Int. Cl.
*A43D 1/02* (2006.01)
*G06T 19/20* (2011.01)
*G06Q 30/06* (2012.01)

(52) U.S. Cl.
CPC ............ *A43D 1/027* (2013.01); *A43D 1/025* (2013.01); *G06Q 30/0643* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 5,813,142 A | 9/1998 | Demon | |
| 6,658,314 B1 | 12/2003 | Gothait | |
| 7,658,464 B2 | 2/2010 | Silverbrook | |
| 8,838,263 B2 | 9/2014 | Sivak et al. | |
| 9,675,135 B2 | 1/2017 | Truitt et al. | |
| 9,676,159 B2 | 6/2017 | Sterman et al. | |
| 9,892,228 B2 | 2/2018 | Schouwenburg et al. | |
| 9,980,535 B2 | 5/2018 | Bohnsack | |
| 10,016,941 B1 | 7/2018 | Beard et al. | |
| 10,241,498 B1* | 3/2019 | Beard | B33Y 50/02 |
| 10,282,914 B1* | 5/2019 | Tran | A61B 5/1128 |
| 2004/0133431 A1 | 7/2004 | Udiljak et al. | |
| 2007/0043582 A1* | 2/2007 | Peveto | A43B 3/26 705/1.1 |
| 2008/0111816 A1 | 5/2008 | Abraham et al. | |
| 2008/0292179 A1 | 11/2008 | Busch | |
| 2011/0001794 A1 | 1/2011 | Bhanti | |
| 2011/0082578 A1 | 4/2011 | Stanhope et al. | |
| 2014/0020192 A1 | 1/2014 | Jones et al. | |
| 2014/0149072 A1 | 5/2014 | Rutschmann | |
| 2014/0182170 A1 | 7/2014 | Wawrousek et al. | |
| 2014/0188260 A1 | 7/2014 | Laymen et al. | |
| 2014/0276235 A1 | 9/2014 | Raniere | |

(Continued)

*Primary Examiner* — Toan H Vu
(74) *Attorney, Agent, or Firm* — McKay Law

(57) ABSTRACT

A process of making a customized shoe. Foot measurements are received from a user, which include the widest part as well as the longest part of a person's left and right foot. Those input builds are resized and used to make a custom fitting shoe using a 3D printer. The dimensions are used to scale a design and then print parts of a shoe such as upper, midsole, sole, and insole on a 3D printer and then assembling or printing a shoe as a whole. This includes partially printing parts of shoes such as the sole and adding an alternate material upper. This also includes printing a shoe in its entirety to the specifications or dimensions provided by the customer.

5 Claims, 8 Drawing Sheets

(56) References Cited

U.S. PATENT DOCUMENTS

| | | |
|---|---|---|
| 2014/0285646 A1* | 9/2014 | Kahlon ..................... G06T 7/55 |
| | | 348/77 |
| 2014/0298682 A1* | 10/2014 | Cavanagh ............ A43B 13/183 |
| | | 36/44 |
| 2015/0081076 A1 | 3/2015 | Fernandes |
| 2015/0101134 A1 | 4/2015 | Manz et al. |
| 2015/0165690 A1 | 6/2015 | Tow |
| 2015/0217520 A1 | 8/2015 | Karpas et al. |
| 2015/0246496 A1 | 9/2015 | Jones et al. |
| 2016/0072986 A1 | 3/2016 | Jones |
| 2016/0349738 A1 | 12/2016 | Sisk |
| 2016/0374431 A1 | 12/2016 | Tow |
| 2017/0068774 A1 | 3/2017 | Cluckers et al. |
| 2017/0245585 A1* | 8/2017 | Cook ...................... A43B 13/14 |
| 2017/0272728 A1* | 9/2017 | Rafii .................... H04N 13/239 |
| 2019/0246745 A1* | 8/2019 | Bock .................... A43B 3/001 |
| 2019/0246747 A1* | 8/2019 | Bock .................. A43B 3/0005 |
| 2021/0037908 A1* | 2/2021 | Busbee ................... A43B 1/14 |

* cited by examiner

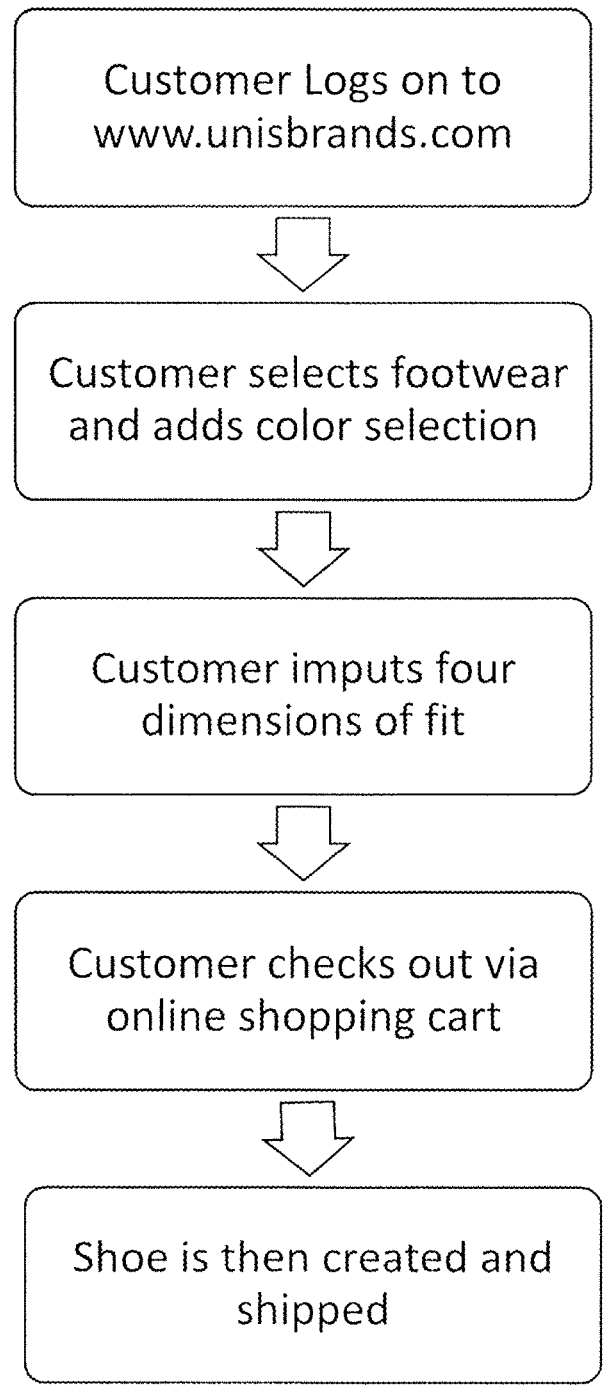
Figure 1: External Process (Consumer End)

Internal Process (Company End)

SIZING:

° LEFT
LENGTH AND WIDTH OF
LONGEST POINT

° RIGHT
LENGTH AND WIDTH OF
LONGEST POINT

PRODUCT AND PROCESS FOR CUSTOM-FIT SHOE

CROSS-REFERENCE TO RELATED APPLICATIONS

The present application claims benefit of provisional application Ser. No. 62/615,056, filed Jan. 9, 2018, the contents of which are incorporated herein by reference.

BACKGROUND

Field of the Invention

The instant invention relates to methods and products, namely shoes, produced using three-dimensional (3D) printer technology.

Description of the Related Art

The sneaker business is a billion-dollar industry. Shoe companies use three-dimensional (3D) printing for prototyping new products and shoe designs. For example, U.S. Pat. No. 8,838,263 to Sivak et al. shows a patient-specific orthotic device using an automated fabrication machine capable of following computer instructions to create 3D surface contours and new developments in non-invasive three-dimensional (3D) scanning have made it possible to acquire digital models of freeform surfaces such as the surface anatomy of the human body and to then fabricate such a patient-specific device with high precision.

U.S. Pat. No. 9,676,159 to Sterman et al. teaches a system and method for forming 3D printed structures includes printing an outer shell portion and filling an interior of the outer shell portion to form an inner portion. The outer shell portion and inner portion may have differing material properties. The outer shell portion may be anchored to the base component.

U.S. Pat. No. 10,016,941 describes systems and methods of capturing images of body parts to create a three-dimensional ("3D") model for designing customized outerwear are provided. Images of a body part are captured by an image sensor on a camera or mobile device from various angles, after which they are combined using an algorithm to generate a point cloud map of the image data which is used to generate a 3D representation of the body part. The 3D model can thus be used to develop highly-customized outerwear for an individual. The 3D model is a digital file which can then be utilized by software to design the customized outerwear and request that the outerwear be manufactured, for example by additive manufacturing on a 3D printer.

U.S. Patent Publication No. 2014/0020192 to Jones et al. shows methods and systems for apparel assembly using three-dimensional printing directly onto fabric apparel materials. Disclosed is a method and system for direct three-dimensional printing and assembly of an article of apparel, including designing a three-dimensional pattern for printing, positioning at least a portion of the article on a tray in a three-dimensional printing system, the portion being positioned substantially flat on the tray, printing a three-dimensional material directly onto the article using the designed pattern, curing the printed material, and removing the article from the three-dimensional printing system.

U.S. Patent Publication No. 2015/0081076 to Fernandes relates to the production of custom articles, and customization of existing articles, responsive to three-dimensional data captured remotely. The invention is particularly applicable to the production of custom shoes and inserts for shoes and can use smart phones to allow users to easily capture information required for custom footwear.

U.S. Patent Publication No. 2015/0101134 to Manz et al. describes methods for the manufacture of a shoe, an apparatus to perform such method, as well as a shoe manufactured by such method. According to certain examples, the method for the manufacture of a shoe includes providing a three-dimensionally pre-shaped first shoe component and processing the three-dimensionally pre-shaped first shoe component, wherein the processing includes an individually controllable succession of processing steps.

U.S. Pat. No. 8,838,263 to Sivak et al. shows a patient-specific orthotic device using an automated fabrication machine capable of following computer instructions to create 3D surface contours and new developments in noninvasive three-dimensional (3D) scanning have made it possible to acquire digital models of freeform surfaces such as the surface anatomy of the human body and to then fabricate such a patient-specific device with high precision.

U.S. Pat. No. 9,676,159 to Sterman et al. teaches a system and method for forming 3D printed structures includes printing an outer shell portion and filling an interior of the outer shell portion to form an inner portion. The outer shell portion and inner portion may have differing material properties. The outer shell portion may be anchored to the base component.

U.S. Pat. No. 10,016,941 describes systems and methods of capturing images of body parts to create a three-dimensional ("3D") model for designing customized outerwear are provided. Images of a body part are captured by an image sensor on a camera or mobile device from various angles, after which they are combined using an algorithm to generate a point cloud map of the image data which is used to generate a 3D representation of the body part. The 3D model can thus be used to develop highly-customized outerwear for an individual. The 3D model is a digital file which can then be utilized by software to design the customized outerwear and request that the outerwear be manufactured, for example by additive manufacturing on a 3D printer.

U.S. Patent Publication No. 2014/0020192 to Jones et al. shows methods and systems for apparel assembly using three-dimensional printing directly onto fabric apparel materials. Disclosed is a method and system for direct three-dimensional printing and assembly of an article of apparel, including designing a three-dimensional pattern for printing, positioning at least a portion of the article on a tray in a three-dimensional printing system, the portion being positioned substantially flat on the tray, printing a three-dimensional material directly onto the article using the designed pattern, curing the printed material, and removing the article from the three-dimensional printing system.

U.S. Patent Publication No. 2015/0081076 to Fernandes relates to the production of custom articles, and customization of existing articles, responsive to three-dimensional data captured remotely. The invention is particularly applicable to the production of custom shoes and inserts for shoes and can use smart phones to allow users to easily capture information required for custom footwear.

U.S. Patent Publication No. 2015/0101134 to Manz et al. describes methods for the manufacture of a shoe, an apparatus to perform such method, as well as a shoe manufactured by such method. According to certain examples, the method for the manufacture of a shoe includes providing a three-dimensionally pre-shaped first shoe component and processing the three-dimensionally pre-shaped first shoe component, wherein the processing includes an individually controllable succession of processing steps.

Shoe companies use three-dimensional (3D) printing for prototyping new products and shoe designs, with limited actual development, largely due to cost and complexity. Moreover, the shoes are not custom-made with input directly from the consumer. Applicant provides herein a custom-fit shoe product and process for producing same using a 3D printer capable of printing in a thermoplastic material that is suitable for the creation of custom footwear.

People love their shoes and want them to fit right for the price they pay. Consumer's complain that shoes do not fit correctly and cause pain. The footwear industry is very dynamic as seasons change, and styles and the ability to keep up with ever-changing demand can be challenging especially when done incorrectly. Customers ultimately hold the power in the industry as a company can invest millions of dollars into a product just for it to fail.

SUMMARY

Comprehended is a process of making a customized shoe, the process comprising the steps of capturing the measurements of the widest part as well as the longest part of a person's left and right foot and then using those dimensions to make a custom fitting shoe using a 3D printer. The dimensions are used to scale a design and then print parts of a shoe such as upper, midsole, sole, and insole on a 3D printer and then assembling or printing a shoe as a whole. This includes partially printing parts of shoes such as the sole and adding an alternate material upper. This also includes printing a shoe in its entirety to the specifications or dimensions provided by the customer.

More particularly, disclosed is a process of making a customized shoe, comprising the steps of: capturing foot measurements of a user, the foot measurements including, solely, a widest part and a longest part of a user's left foot and right foot, thereby receiving input builds; re-sizing the input builds; using the input builds to produce a 3D model; using the 3D model to print the customized shoe; and, assembling the customized shoe.

BRIEF DESCRIPTION OF THE DRAWINGS

FIG. 1 shows a flow chart of the external process at the consumer end.

DETAILED DESCRIPTION OF THE PREFERRED EMBODIMENT

Figure 1A:
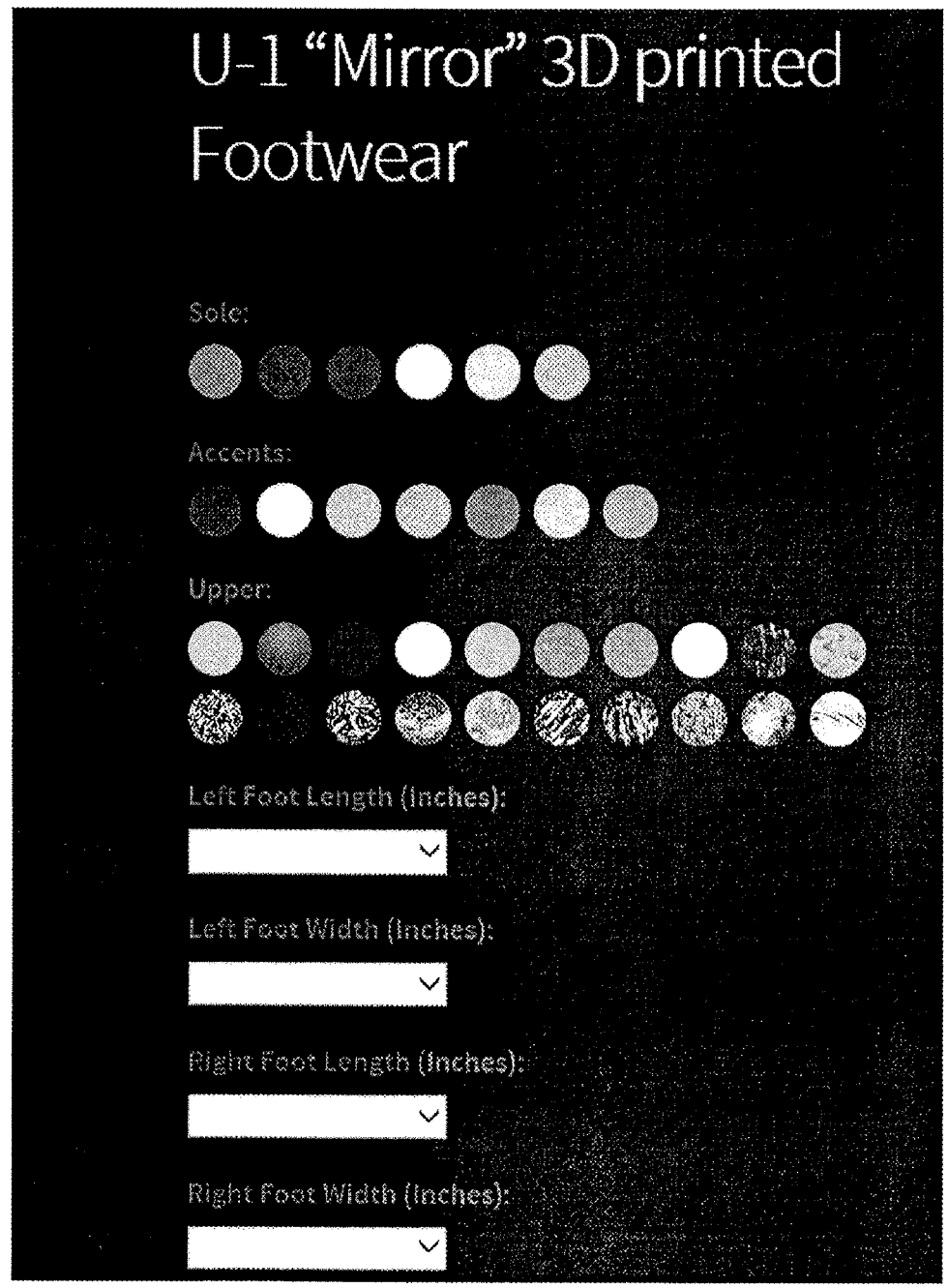
FIG. 1a shows a screen shot of an example user interface for allowing a user or customer to input the shoe build values.

The flow charts, diagrammatic illustrations and/or sections thereof represent the method with computer control logic or program flow that can be executed by a specialized device or a computer and/or implemented on computer readable media or the like (residing on a drive or device after download) tangibly embodying the program of instructions. The executions are typically performed on a computer or specialized device as part of a global communications network such as the Internet. For example, a computer or mobile phone typically has a web browser or user interface installed within the CPU for allowing the viewing of information retrieved via a network on the display device. A network may also be construed as a local, ethernet connection or a global digital/broadband or wireless network or cloud computing network or the like. The specialized device, or "device" as termed herein, may include any device having circuitry or be a hand-held device, including but not limited to a tablet, smart phone, cellular phone or personal digital assistant (PDA) including but not limited to a mobile smartphone running a mobile software application (App). Accordingly, multiple modes of implementation are possible and "system" or "computer program product" or "non-transitory computer readable medium" covers these multiple modes.

Applicant currently uses three-dimensional (3D) printers to create custom footwear for the customer. The 3D printers that Applicant uses are made in-house allowing for modifications and redesigns to be applied. In an exemplary embodiment, the printers are standard RepRap which is an open design, replicating rapid prototype. RepRap print objects from a variety of thermoplastics. The 3D printer uses three-dimensional parts created based on a CAD drawing. Any 3D modeling program may be used. The printer is capable of slicing the CAD design into thousands of layers. The printer then extrudes hot material layer by layer until the object is complete. The preferred material is thermoplastic polyurethane (TPU). TPU is any of a class of polyurethane plastics with its many properties, including elasticity, transparency, and resistance to oil, grease and abrasion. Having the printers made in-house is a critical advantage as applicant can control the print volume as well as material selection. With proprietary printers, you are limited to small print volumes as well as limited and very expensive material.

Created footwear is available for purchase via the website accessed from a desktop or mobile smartphone. The company offers a large library of footwear models for the customer to choose from. Not only can the customer choose their model, but they will also be able to add graphics colors and finishes to their footwear. After both the model and graphics are selected, the model can be resized to the customer's feet taking the length and width of the customers left and right feet which is then implemented into the design to be 3D printed. The algorithm stretches the length of the 3D model to match the dimension the customer provided then matches the width and stretches the width to match the dimension provided, as further described. This is then repeated for the other foot.

The product fits near exact sizing of the customer's foot as well as delivers a stylish look. Currently 3D printers are limited to printing in solid colors as well as printing at slow speeds. With the brands, current technology, a pair of shoes can be delivered in twenty-four hours with complex designs and colors. Customer support is also a prime sector of our business, as the customer will interact with our customizable website and phone support line. With the current target market of "Casual-Orthopedic" the footwear is geared towards casual wear with orthopedic support.

Referencing then FIGS. 1-4, a customer, via their device, logs onto to the web site of the applicant (www.unisbrands.com), termed herein service provider 10, where the length and width of both the user's left and right foot are entered for sizing based on the dimensions of the foot (for fit) 14, and the customer may choose a style and type of shoe 12. Styles can be categorized as low top sneaker, high top sneaker, sandal, slide, mid top sneakers. Different colors and graphics may be applied to the choice of shoe along with any modifications you may want to make. In addition, for the fit process 14, the customer may choose how they would like the shoe to fit i.e. tight, regular, large, as well as the cushion, light, medium, and high, termed herein customizing the fit. Service provider then allows the customer to check out via an online shopping cart 16. Service provider then creates the shoe 18, i.e. prints the complete shoe at the warehouse and applies any graphics the customer may have chosen. Delivery is the final step, as the customer you can have your delivered directly to your front door. This process can give the customer a near perfect fit while also bringing the shoes to a made-to-order status.

Figure 2:
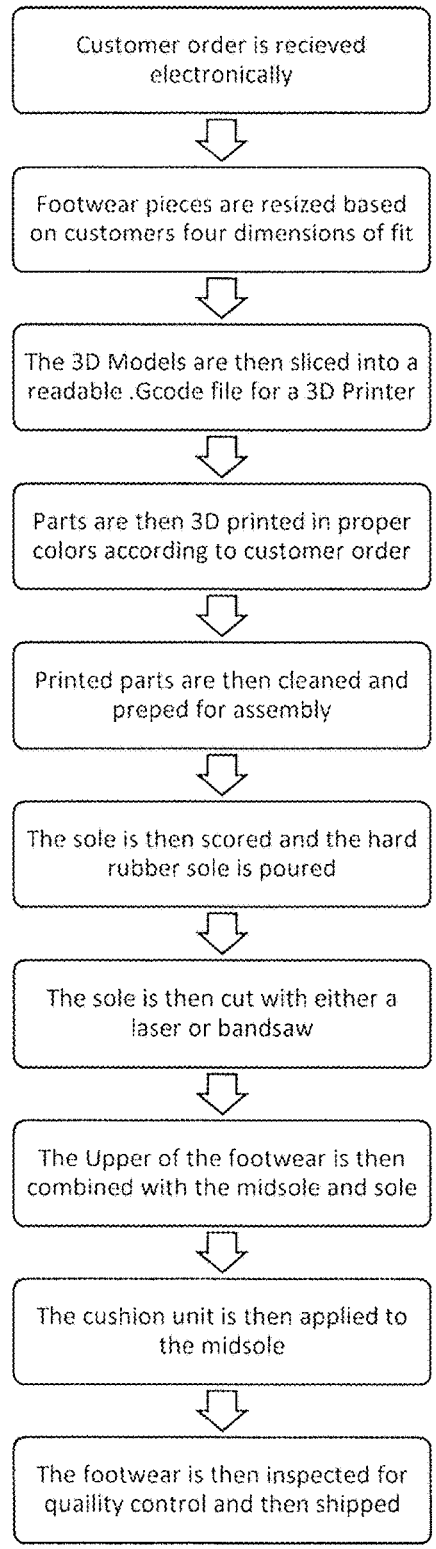
FIG. 2 shows a flow chart of the internal process at the service provider end.
Figure 2A:
FIG. 2a shows a diagrammatic representation of the algorithm steps after receiving the build values.
Figure 2A:
Figure 3:
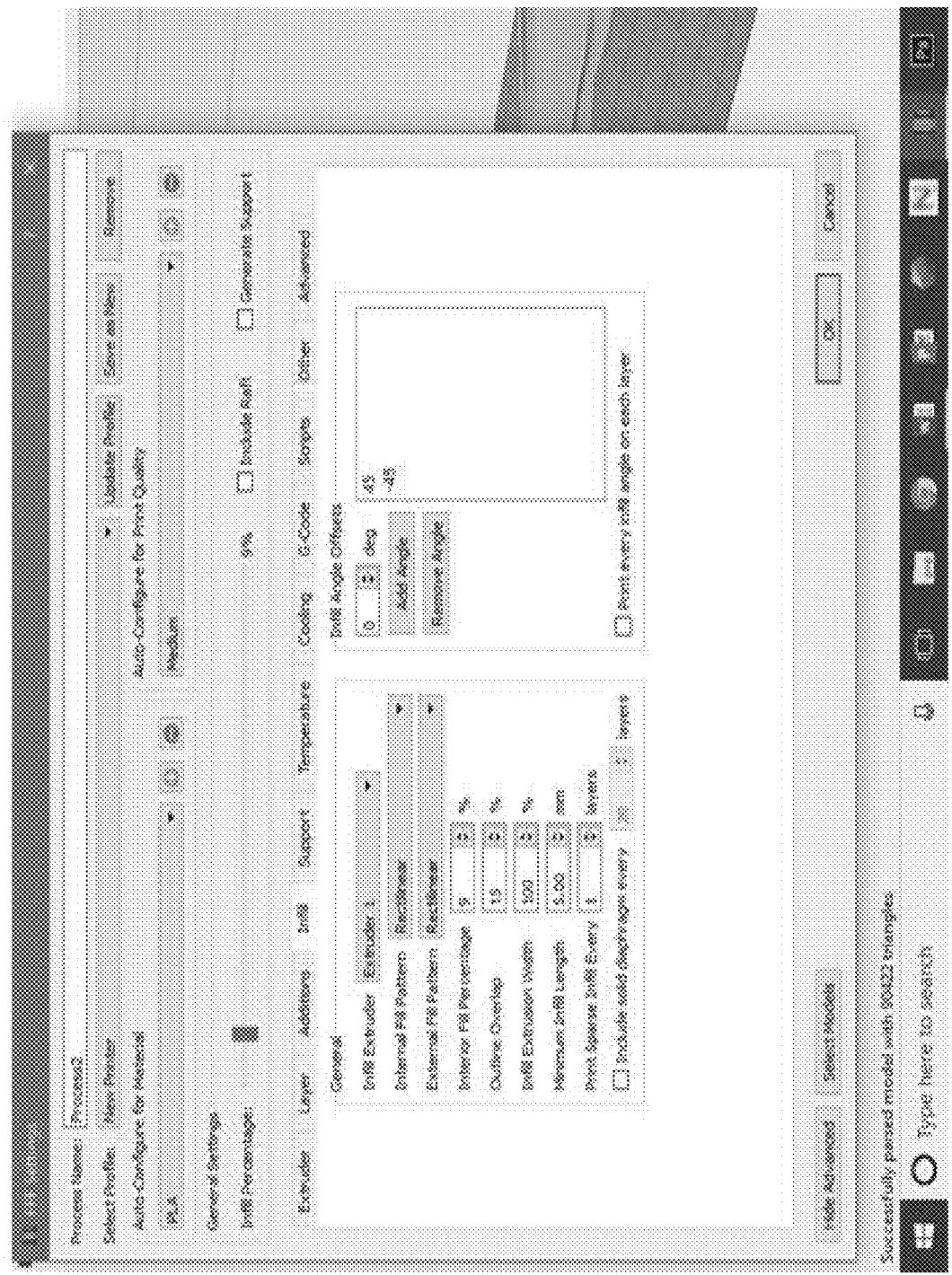
FIGS. 3 and 4 show screenshots of an example printer configuration for the instant embodiments.
Figure 3A:
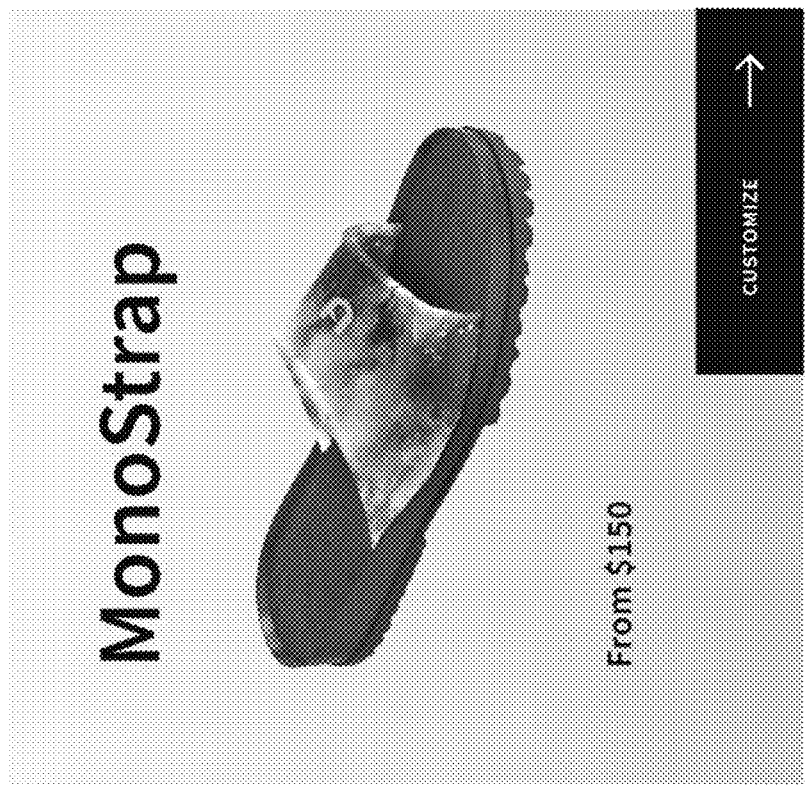
FIG. 3a shows a screen shot of an example product produced by the instant method which is available for customization by the consumer.
Figure 3A:
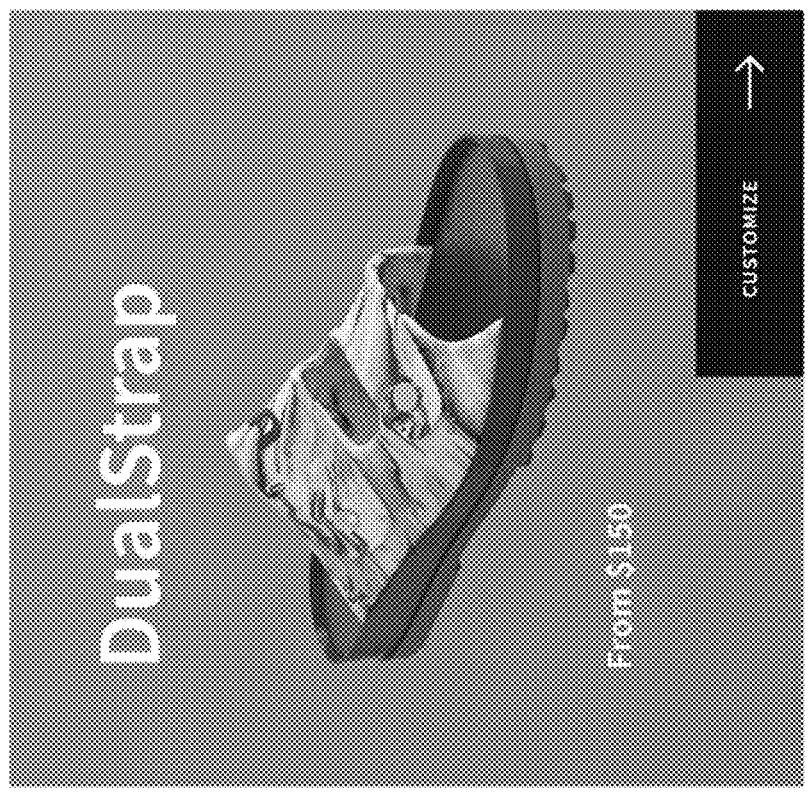
Figure 4:
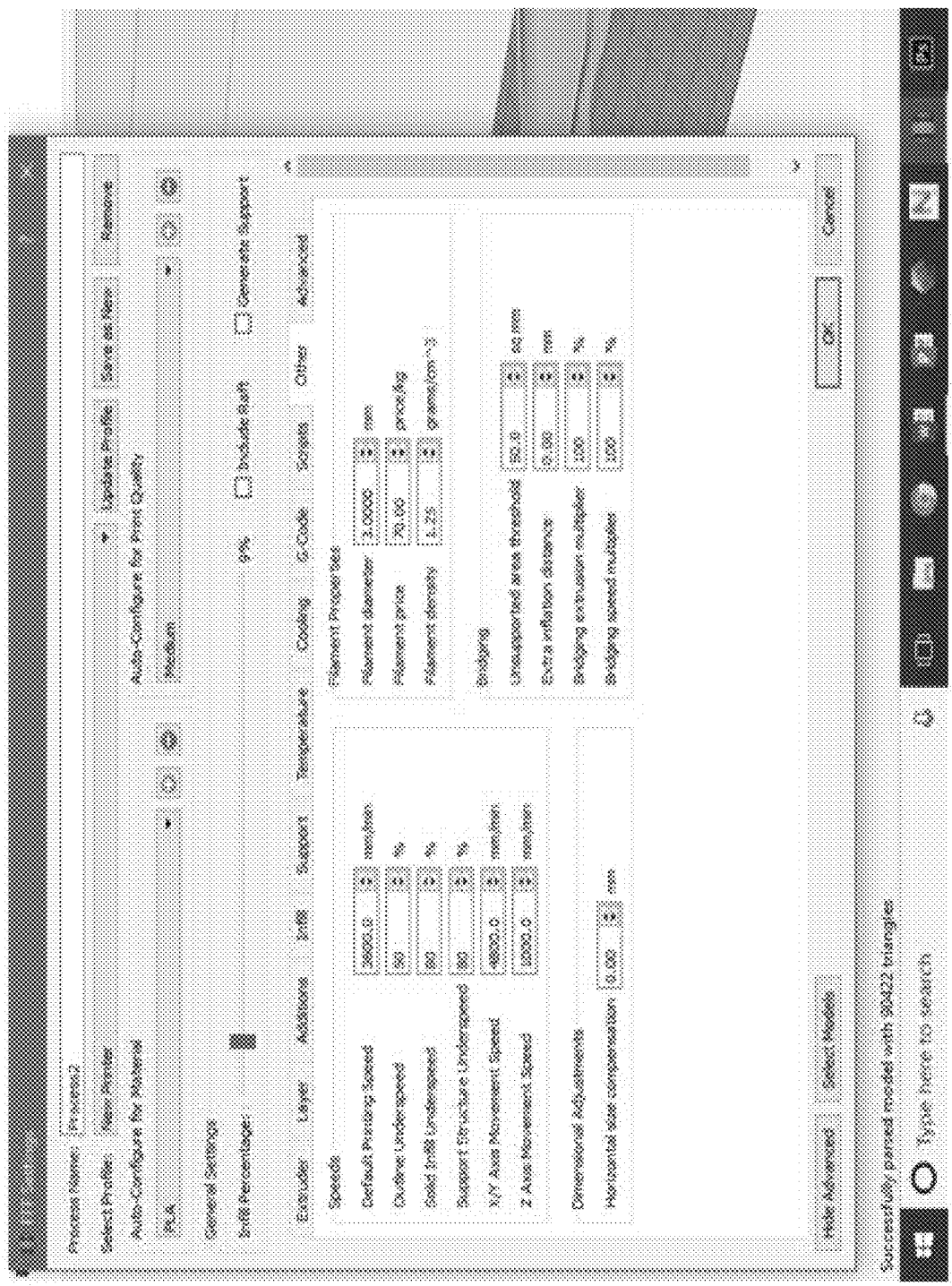
Figure 4A:
FIG. 4a shows a screen shot of a similar shoe product during the customization process soon ready to be purchased through the checkout process.

The customer order is received by the service provider 20. Footwear pieces are resized based on customer selections 21. Termed herein the "input builds" or four dimensions of fit, critical is that only the length and width of each foot is required. As part of the algorithm herein described by FIG. 2, 0.25 inches are added to the length and width input builds. Although the re-size does not have to be exactly 0.25 inches, this critical step of re-sizing the input builds allows for a variance upon production ("production variance") such that the products can thereafter be manually resized to more precisely match user dimensions. The manual resizing of components thereby provides a highly custom fit. See for example FIG. 2a, the input builds of which are then expanded for purposes of leaving a margin of error within the build settings input by the service provider for a subsequent manual assembly. Example settings are provided by FIGS. 3 and 4, the settings of which are important for the build but may vary according to many variables such as software used and printer. The input builds are used to draw 2D models, which are then used to create 3D models.

The 3D models are then sliced into a readable .Gcode file for a 3D printer 22. The parts are then 3D printed in the appropriate colors according to the customer order 23. Printed parts are the cleaned and prepared for assembly 24.

As part of the assembly process, the sole is scored and the hard rubber sole is poured 25. The sole is scored for example using a razor or dremel. More particularly, the bottom of the sole is scored by cutting lines into the bottom of the sole, thereby exposing the inside of the sole and creating a rough surface on which the hard rubber can be applied. A mold is the placed on the sole in which liquid rubber can be poured, and the bottom of the mold contains the tread pattern to create the sole. The sole is then cut with either a laser or a bandsaw 26. After the sole is poured there is excess material. This excess needs to be trimmed which can be done in either fashion, and surfaces can be finished and sanded as needed. The upper of the footwear is then combined with the midsole and sole 27. All parts are combined at the seams with either an adhesive or heat weld. The cushion unit is the applied to the midsole 28. The footwear is then inspected for quality control and then shipped 29. Note each part is individually printed then assembled to make a complete shoe product.

A major benefit to this way of manufacturing shoes is complete customization. The customer can get exactly what they are looking for with the perfect fit. This process is also benefiting those with disabilities, helping to get shoes that are easy to put on and have a perfect fit.

I claim:

1. A process of making a customized shoe, comprising the steps of:
    capturing, using a computer, foot measurements of a user, said foot measurements including, solely, a widest part and a longest part of a left foot and right foot of said user, thereby receiving input builds;
    re-sizing said input builds;
    producing a three-dimensional model using said input builds;
    printing parts of said customized shoe using said three-dimensional model; and,
    assembling said parts into said customized shoe.

2. The process of claim 1, further comprising the step of allowing said user to select a customized fit of said customized shoe.

3. The process of claim 1, further comprising the step of applying graphics chosen by said user to said customized shoe.

4. The process of claim 1, wherein for the step of re-sizing said input builds, said foot measurements are increased such that a margin of error within said input builds allows for a production variance.

5. The process of claim 1, wherein the step of assembling said parts further comprises the steps of:
    scoring a sole by cutting lines into a bottom of said sole;
    placing a mold on said sole;
    pouring liquid rubber into said mold;
    cutting and trimming said sole;
    combining an upper with a midsole and said sole; and,
    applying a cushion unit to said midsole.

* * * * *